US009734092B2

(12) United States Patent
Horovitz et al.

(10) Patent No.: US 9,734,092 B2
(45) Date of Patent: Aug. 15, 2017

(54) SECURE SUPPORT FOR I/O IN SOFTWARE CRYPTOPROCESSOR

(71) Applicant: Facebook, Inc., Menlo Park, CA (US)

(72) Inventors: Oded Horovitz, Palo Alto, CA (US); Sahil Rihan, Menlo Park, CA (US); Stephen A. Weis, San Francisco, CA (US); Carl A. Waldspurger, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/663,217

(22) Filed: Mar. 19, 2015

(65) Prior Publication Data
US 2015/0269091 A1 Sep. 24, 2015

Related U.S. Application Data

(60) Provisional application No. 61/955,709, filed on Mar. 19, 2014.

(51) Int. Cl.
G06F 12/08 (2016.01)
G06F 12/14 (2006.01)
G06F 12/1081 (2016.01)
G06F 12/0888 (2016.01)
G06F 12/126 (2016.01)
G06F 21/79 (2013.01)

(52) U.S. Cl.
CPC ...... G06F 12/1408 (2013.01); G06F 12/0888 (2013.01); G06F 12/1081 (2013.01); G06F 12/126 (2013.01); G06F 12/145 (2013.01); G06F 12/1425 (2013.01); G06F 21/79 (2013.01); G06F 2212/1052 (2013.01); G06F 2212/6042 (2013.01); G06F 2212/621 (2013.01)

(58) Field of Classification Search
CPC .... G06F 21/79; G06F 12/1408; G06F 12/145; G06F 12/1425; G06F 12/126; G06F 12/0888; G06F 12/1081; G06F 2212/1052; G06F 2212/621; G06F 2212/6042
USPC .......................................... 711/103, 170, 133
See application file for complete search history.

(56) References Cited

U.S. PATENT DOCUMENTS

| 5,875,472 | A | 2/1999 | Bauman et al. |
| 6,026,475 | A | 2/2000 | Woodman |
| 6,044,478 | A | 3/2000 | Green et al. |
| 6,129,458 | A | 10/2000 | Waters et al. |

(Continued)

OTHER PUBLICATIONS

"Intel 64 and IA-32 Architectures Software Developers Manual, vol. 3 (3A, 3B & 3C): System Programming Guide," Intel Corporation, Jun. 2015, pp. 1-1638.

(Continued)

Primary Examiner — Pierre-Michel Bataille
(74) Attorney, Agent, or Firm — Perkins Coie LLP

(57) ABSTRACT

Methods and systems for securing sensitive data from security risks associated with direct memory access ("DMA") by input/output ("I/O") devices are provided. An enhanced software cryptoprocessor system secures sensitive data using various techniques, including (1) protecting sensitive data by preventing DMA by an I/O device to the portion of the cache that stores the sensitive data, (2) protecting device data by preventing cross-device access to device data using DMA isolation, and (3) protecting the cache by preventing the pessimistic eviction of cache lines on DMA writes to main memory.

20 Claims, 4 Drawing Sheets

(56) References Cited

U.S. PATENT DOCUMENTS

| | | | |
|---|---|---|---|
| 6,223,256 B1 | 4/2001 | Gaither et al. | |
| 6,389,442 B1 | 5/2002 | Yin et al. | |
| 6,697,927 B2 | 2/2004 | Bonola et al. | |
| 6,957,304 B2* | 10/2005 | Wilkerson | G06F 9/383 711/137 |
| 6,970,960 B1 | 11/2005 | Sarfati et al. | |
| 7,266,661 B2 | 9/2007 | Walmsley et al. | |
| 7,434,000 B1 | 10/2008 | Barreh et al. | |
| 7,577,851 B2 | 8/2009 | Inamura et al. | |
| 7,657,756 B2 | 2/2010 | Hall et al. | |
| 7,671,864 B2 | 3/2010 | Román et al. | |
| 7,774,622 B2 | 8/2010 | Mitra et al. | |
| 8,037,250 B1 | 10/2011 | Barreh et al. | |
| 8,135,962 B2 | 3/2012 | Strongin et al. | |
| 8,266,676 B2 | 9/2012 | Hardjono et al. | |
| 8,352,718 B1 | 1/2013 | Rao et al. | |
| 8,549,288 B2 | 10/2013 | Bade et al. | |
| 8,615,665 B2 | 12/2013 | Fitton et al. | |
| 8,726,364 B2 | 5/2014 | Smith et al. | |
| 8,738,932 B2 | 5/2014 | Lee et al. | |
| 8,782,433 B2 | 7/2014 | Kaabouch et al. | |
| 8,812,796 B2 | 8/2014 | Gray et al. | |
| 8,886,959 B2 | 11/2014 | Tamiya et al. | |
| 8,904,477 B2 | 12/2014 | Walker et al. | |
| 8,924,743 B2 | 12/2014 | Wolfe et al. | |
| 8,949,797 B2 | 2/2015 | Christodorescu et al. | |
| 8,990,582 B2 | 3/2015 | McGrew et al. | |
| 9,164,924 B2 | 10/2015 | Horovitz et al. | |
| 9,361,449 B2 | 6/2016 | Sugano | |
| 9,477,603 B2 | 10/2016 | Waldspurger et al. | |
| 9,639,482 B2 | 5/2017 | Weis et al. | |
| 2002/0004860 A1 | 1/2002 | Roman et al. | |
| 2002/0116584 A1* | 8/2002 | Wilkerson | G06F 9/383 711/137 |
| 2002/0116595 A1 | 8/2002 | Morton et al. | |
| 2002/0138700 A1 | 9/2002 | Holmberg et al. | |
| 2003/0033480 A1 | 2/2003 | Jeremiassen et al. | |
| 2003/0065892 A1 | 4/2003 | Bonola | |
| 2003/0188178 A1 | 10/2003 | Strongin et al. | |
| 2003/0236947 A1 | 12/2003 | Yamazaki et al. | |
| 2004/0111639 A1 | 6/2004 | Schwartz et al. | |
| 2006/0015748 A1 | 1/2006 | Goto et al. | |
| 2006/0020941 A1 | 1/2006 | Inamura et al. | |
| 2006/0080553 A1 | 4/2006 | Hall et al. | |
| 2006/0179228 A1 | 8/2006 | Thompson et al. | |
| 2007/0239938 A1 | 10/2007 | Pong et al. | |
| 2007/0288228 A1 | 12/2007 | Taillefer et al. | |
| 2008/0010413 A1 | 1/2008 | Kailas et al. | |
| 2008/0022160 A1 | 1/2008 | Chakraborty et al. | |
| 2008/0109660 A1 | 5/2008 | Mitra et al. | |
| 2008/0229118 A1 | 9/2008 | Kasako et al. | |
| 2008/0235804 A1 | 9/2008 | Bade et al. | |
| 2009/0094601 A1* | 4/2009 | Vstovskiy | G06F 21/123 717/177 |
| 2009/0254895 A1* | 10/2009 | Chen | G06F 8/4442 717/161 |
| 2009/0328195 A1 | 12/2009 | Smith et al. | |
| 2010/0005300 A1 | 1/2010 | Klotsche et al. | |
| 2010/0062844 A1 | 3/2010 | Crowder, Jr. et al. | |
| 2010/0064144 A1 | 3/2010 | Kaabouch et al. | |
| 2010/0115620 A1 | 5/2010 | Alme et al. | |
| 2010/0268692 A1 | 10/2010 | Resch et al. | |
| 2010/0281223 A1 | 11/2010 | Wolfe et al. | |
| 2010/0281273 A1 | 11/2010 | Lee et al. | |
| 2010/0287385 A1 | 11/2010 | Conte et al. | |
| 2011/0022818 A1 | 1/2011 | Kegel et al. | |
| 2011/0040940 A1 | 2/2011 | Wells et al. | |
| 2011/0047362 A1 | 2/2011 | Eichenberger et al. | |
| 2011/0113260 A1 | 5/2011 | Ma et al. | |
| 2011/0167278 A1 | 7/2011 | Goto et al. | |
| 2011/0258610 A1 | 10/2011 | Aaraj et al. | |
| 2011/0314468 A1 | 12/2011 | Zhou et al. | |
| 2012/0124296 A1 | 5/2012 | Bryant et al. | |
| 2012/0317569 A1 | 12/2012 | Payne, Jr. | |
| 2013/0067245 A1 | 3/2013 | Horovitz et al. | |
| 2013/0090091 A1 | 4/2013 | Weng et al. | |
| 2013/0125244 A1 | 5/2013 | Sugano et al. | |
| 2013/0159726 A1 | 6/2013 | McKeen et al. | |
| 2013/0191651 A1 | 7/2013 | Muff et al. | |
| 2013/0254494 A1 | 9/2013 | Oxford | |
| 2013/0263121 A1 | 10/2013 | Franke et al. | |
| 2014/0007087 A1 | 1/2014 | Scott-Nash | |
| 2014/0108649 A1 | 4/2014 | Barton et al. | |
| 2014/0173275 A1 | 6/2014 | Johnson et al. | |
| 2014/0201452 A1 | 7/2014 | Meredith et al. | |
| 2015/0067265 A1 | 3/2015 | Weis et al. | |
| 2015/0089152 A1 | 3/2015 | Busaba | |
| 2015/0089153 A1 | 3/2015 | Busaba | |
| 2015/0089154 A1 | 3/2015 | Busaba | |
| 2015/0089155 A1 | 3/2015 | Busaba | |
| 2015/0089159 A1 | 3/2015 | Busaba | |
| 2015/0089502 A1 | 3/2015 | Weis et al. | |
| 2015/0134932 A1* | 5/2015 | Mcnairy | G06F 9/30076 712/37 |
| 2015/0149732 A1* | 5/2015 | Kiperberg | G06F 12/1408 711/139 |
| 2015/0186295 A1 | 7/2015 | Long et al. | |
| 2015/0227744 A1 | 8/2015 | Horowitz et al. | |
| 2015/0378731 A1 | 12/2015 | Lai | |
| 2016/0224475 A1 | 8/2016 | Horovitz et al. | |

OTHER PUBLICATIONS

Trusted Computing Group, [retrieved on Nov. 11, 2015], Retrieved from the internet: <http://www.trustedcomputinggroup.org>, 2015, 1 page.

Cache management via page coloring, Wikipedia, [retrieved on Nov. 12, 2015], Retrieved from the Internet: <http://en.Wikipedia.org/wiki/cache_coloring>, Nov. 6, 2015, 2 pages.

Hardware security module, Wikipedia, [retrieved on Nov. 12, 2015], Retrieved from the Internet: <http://en.wikipedia.org/wiki/hardware_security_module>, Oct. 21, 2015, 5 pages.

Intel® Trusted Execution Technology (Intel® TXT), Software Development Guide, Measured Launch Environment Developer's Guide, Revision 012, Document: 315168-012, [retrieved on Nov. 12, 2015], Retrieved from the internet: <http://download.Intel.com/technology/security/downloads/315168.pdf>, Jul. 2015, pp. 1-169.

Anati Ittai, et al., "Innovative Technology for CPU Based Attestation and Sealing", Proceedings of the Second International Workshop on Hardware and Architectural Support for Security and Privacy (HASP '13), Jun. 2013, pp. 1-7.

Baumann, A., et al., "Shielding Applications from an Untrusted Cloud wth Haven," Proceedings of the 11th USENIX Symposium on Operating Systems Design and Implementation, Oct. 6-8, 2014, pp. 267-283.

Bellard, F., "QEMU, a fast and portable dynamic translator", Proceedings of the USE NIX 2005 Annual Technical Conference, FREEN/X Track, Apr. 2005, pp. 41-46.

Bochs, "The Cross-Platform IA-32 Emulator" [retrieved on Aug. 26, 2015] Retrieved from the Internet: <http://bochs.sourceforge.net/>, May 3, 2015, 2 pages.

Bugnion, E. et al., "Compiler-directed page coloring for multiprocessors", Proceedings of the Seventh International Conference on Architectural Support for Programming Languages and Operating Systems (ASPLOS VII), ACM, Oct. 1996, 12 pages.

Chen, X. et al., "Overshadow: A Virtualization-Based Approach to Retrofitting Protection in Commodity Operating Systems", Proceedings of the Thirteenth International Conference on Architectural Support for Programming Languages and Operating Systems (ASPLOS '08), ACM, Mar. 1-5, 2008, pp. 2-13.

Chen, X., et al., "Operating System Controlled Processor-Memory Bus Encryption", in Proceedings of Design, Automation and Test in Europe, 2008, (DATE'08), IEEE, pp. 1154-1159.

Iyer, Ravi, "CQoS: A Framework for Enabling QoS in Shared Caches of CMP Platforms," In Proceedings of the 18th Annual International Conference on Supercomputing (ICS '04), ACM, Jun. 26-Jul. 1, 2004, pp. 257-266.

McKeen, F., et al., "Innovative Instructions and Software Model for Isolated Execution", Proceedings of the Second International Work-

(56) References Cited

OTHER PUBLICATIONS shop on Hardware and Architectural Support for Security and Privacy (HASP '13), ACM, Jun. 2013, pp. 1-8.
Muller, T. et al., "TRESOR Runs Encryption Securely Outside RAM", in Proceedings of the 20th USENIX Security Symposium [retrieved Nov. 12, 2015] Retrieved from the Internet: <http://www.usenix.org/events/sec11/tech/full_papers/muller.pdf>, Aug. 2011, pp. 1-16.
Peterson, Peter A.H., "Cryptkeeper: Improving Security with Encrypted RAM", in IEEE International Conference on Technologies for Homeland Security (HST 2010), Nov. 2010, pp. 1-7.
Ports, Dan R.K. et al., "Towards application security on untrusted operating systems", Proceedings of the Third Conference on Hot Topics in Security (HOTSEC '08), Jul. 2008, 7 pages.
Rosenblum, M., et al., "Using the SimOS machine simulator to study complex computer systems", ACM Transactions on Modeling and Computer Simulation, vol. 7, Issue 1, Jan. 1997, pp. 78-103.
Vasudevan, A., et al. "CARMA: A Hardware Tamper-Resistant Isolated Execution Environment on Commodity x86 Platforms", in Proceedings of the ACM Symposium on Information,Computer and Communications Security (ASIACCS 2012), May 2012, 5 pages.
Zhang, X. et al. 2009, "Towards practical page coloring-based multicore cache management", Proceedings of the 4th ACM European Conference on Computer Systems (EuroSys '09), ACM, Apr. 1-3, 2009, pp. 89-102.
Advisory Action mailed Aug. 19, 2014, for U.S. Appl. No. 13/614,935 of Horovitz, O. et al., filed Sep. 13, 2015.
Extended European Search Report mailed Aug. 5, 2015, for European Patent Application No. 12831564.5, 7 pages.
Final Office Action mailed Jun. 5, 2014, for U.S. Appl. No. 13/614,935 of Horovitz, O., filed Sep. 13, 2012.
International Search Report and Written Opinion of International Application No. PCT/US12/55210, Jan. 25, 2013, 11 pages.
Non-Final Office Action mailed Feb. 19, 2015, for U.S. Appl. No. 13/614,935 of Horovitz, O., filed Sep. 13, 2012.
Non-Final Office Action mailed Nov. 18, 2013, for U.S. Appl. No. 13/614,935 of Horovitz, O., filed Sep. 13, 2012.
Notice of Allowance mailed Jul. 15, 2015, for U.S. Appl. No. 13/614,935 of Horovitz, O., filed Sep. 13, 2012.
Restriction Requirement mailed Aug. 27, 2013, for U.S. Appl. No. 13/614,935 of Horovitz, O. et al., filed Sep. 13, 2015.
U.S. Appl. No. 13/614,935, of Horovitz, O., et al. filed Sep. 13, 2012.
U.S. Appl. No. 14/479,239 of Horovitz, O. et al., filed Aug. 5, 2014.
U.S. Appl. No. 14/497,111 of Horovitz, O. et al., filed Sep. 25, 2014.
U.S. Appl. No. 14/504,203 of Horovitz, O. et al., filed Oct. 1, 2014.
U.S. Appl. No. 14/618,099 of Horovitz, O. et al., filed Feb. 10, 2015.
U.S. Appl. No. 14/820,428 of Horovitz, O. et al., filed Aug. 6, 2015.
U.S. Appl. No. 15/274,981 of Waldspurger, C., et al., filed Sep. 23, 2016.
Non-Final Office Action mailed Nov. 15, 2016, for U.S. Appl. No. 14/618,099 of Horovitz, O. et al., filed Feb. 10, 2015.
Non-Final Office Action mailed Oct. 6, 2016, for U.S. Appl. No. 14/820,428 of Horovitz, O. et al., filed Aug. 6, 2015.
Non-Final Office Action mailed Nov. 30, 2016, for U.S. Appl. No. 14/504,203 of Horovitz, O. et al., filed Oct. 1, 2014.
Notice of Allowance mailed Jun. 27, 2016, for U.S. Appl. No. 14/479,239 of Waldspurger, C. et al., filed Sep. 5, 2014.
Non-Final Office Action mailed Jul. 28, 2016, for U.S. Appl. No. 14/497,111 of Horovitz, O. et al., filed Sep. 25, 2014.
First Office Action mailed Aug. 2, 2016, for Japanese Patent Application No. 2014-530797, 7 pages.
Deayton, Peter et al., "Set Utilization Based Dynamic Shared Cache Partitioning", Parallel and Distributed Systems (ICPADS), 2011 IEEE 17th International Conference, Dec. 7-9, 2011, pp. 284-291.
Li, Zhiyuan , "Reducing Cache Conflicts by Partitioning and Privatizing Shared Arrays", Parallel Architectures and Compilation Techniques Proceedings, International Conference on 1999, 1999, pp. 183-190.
Rajimwale, Abhishek et al., "Coerced Cache Eviction and Discreet Mode Journaling: Dealing with Misbehaving Disks", IEEE/IFIP 41st International Conference on Dependable Systems & Networks (DSN), Jun. 27-30, 2011, pp. 518-529.
Final Office Action mailed May 18, 2017 for U.S. Appl. No. 14/504,203 of Horovitz, O. et al., filed Oct. 1, 2014.
Non-Final Office Action mailed May 26, 2017, for U.S. Appl. No. 14/497,111 of Horovitz, O. et al., filed Sep. 25, 2014.
Notice of Allowance mailed May 4, 2017, for U.S. Appl. No. 14/618,099 of Horovitz, O. et al., filed Feb. 10, 2015.
Final Office Action mailed Dec. 27, 2016, for U.S. Appl. No. 14/497,111 of Horovitz, O. et al., filed Sep. 25, 2014.
Second Office Action mailed Dec. 6, 2016 for Japanese Patent Application No. 2014-530797, 4 pages.
Notice of Allowance mailed Jan. 25, 2017 for U.S. Appl. No. 14/820,428 of Horovitz, O. et al., filed Aug. 6, 2015.

\* cited by examiner

SECURE SUPPORT FOR I/O IN SOFTWARE CRYPTOPROCESSOR

CROSS REFERENCE TO RELATED APPLICATION(S)

This application claims the benefit of U.S. Provisional Patent No. 61/955,709 filed Mar. 19, 2014, which is hereby incorporated by reference.

BACKGROUND

Many computer systems routinely process sensitive data whose confidentiality and integrity needs to be protected from various security risks. Although the protection of such sensitive data can be enhanced by preventing unauthorized physical access and connection to malicious input/output ("I/O devices"), such protection is particularly challenging in cloud-computing environments, where users do not have physical control over the hardware that executes their workloads.

A software cryptoprocessor employs cryptographic techniques to provide confidentiality and integrity for an entire system, including both user-mode applications and privileged-mode system software, such as a hypervisor or an operating system. One software cryptoprocessor is described in U.S. Patent Publication No. US 20130067245 A1, entitled "Software Cryptoprocessor," which is hereby incorporated by reference. In such a software cryptoprocessor, only the main processor needs to be trusted to operate according to its specifications; other system hardware is considered untrusted and potentially malicious. A software cryptoprocessor ensures that data (including code) is available as cleartext only within trusted portions of the processor cache but remains encrypted in main memory. To ensure the data is available in cleartext only within trusted portions of the processor cache, a software cryptoprocessor encrypts data to be stored in main memory before the data leaves the central processing unit ("CPU") package and decrypts data loaded from main memory after being loaded into the CPU package.

A software cryptoprocessor may use techniques, such as encrypted demand paging, to transfer data securely between main memory and the processor cache in a manner that is transparent to applications. In effect, the software cryptoprocessor treats the processor cache like main memory in a conventional system and treats main memory like a conventional backing store on disk or other secondary storage. Such techniques, however, may result in degraded performance as a result of increased memory pressure, due to the relatively small amount of cache serving as "main memory." For example, although a modern Intel x86 processor contains tens of megabytes of cache, typical systems using such processors are configured with tens of gigabytes of RAM used as main memory, that is, roughly a thousand times larger than the cache.

Although a software cryptoprocessor does not need to trust hardware devices other than the CPU, it does need to allow access to I/O devices such as those commonly used for storage and networking. Such devices typically employ direct memory access ("DMA") to transfer data between the I/O device and main memory efficiently, without involving the main processor. Since DMA occurs at a hardware level, system software can mediate only at the start or end of a DMA but cannot mediate while the access is in progress.

Unfortunately, the inability to mediate during DMA presents problems for a software cryptoprocessor. A malicious or malfunctioning I/O device could directly access cleartext data associated with the software cryptoprocessor and its applications, making it possible to violate both confidentiality and integrity by reading or tampering with sensitive data. In a software cryptoprocessor, only data resident in the cache can be trusted, and all main memory is considered untrusted. Some software cryptoprocessors may allow portions of the cache itself to be untrusted.

Since a software cryptoprocessor does not encrypt and decrypt data of a DMA by an I/O device, such a DMA should be to main memory containing cleartext data from the perspective of the software cryptoprocessor. The data may, however, be encrypted or transformed independently by other system components, such as by software prior to issuing I/O writes that are ultimately transferred to a device via DMA. For example, many storage subsystems implement file-level or block-level encryption, and network subsystems commonly implement secure protocols such as SSL and IPsec.

The use of untrusted devices also exposes software to time of "check to time of use" ("TOCTOU") attacks, where data, such as a security credential, is changed after it has been checked but before it is used. For example, a malicious device that is able to write to main memory via DMA can modify data while the data is being processed by software. This enables the device to exploit a race condition between the time that software has finished validating data and the time that data is used throughout the system. The device can inject malicious contents that would have otherwise failed verification. To avoid such an attack, a software cryptoprocessor first copies untrusted device data into an area of memory that is not accessible to untrusted devices before the device data is validated.

Some systems, including Intel x86 platforms, implement cache-coherent DMA. Typically, cache coherency is achieved by having hardware snoop for a DMA on the memory interconnect, and corresponding cache lines are typically invalidated or evicted to main memory. However, recent performance optimizations, such as Intel Data Direct I/O Technology ("DDIO"), allow portions of memory to be read from or written to the cache directly by a device. DMA can utilize a certain portion of the cache, storing device data directly into the cache, without first going through main memory. For example, on platforms using the Intel x86 Sandy Bridge EP processor, DDIO may allocate up to 10% of the last level cache ("LLC"). In such systems, the main memory and cache controllers may evict other resident cache lines to make room for the data of a DMA write. These systems may pessimistically evict lines from the cache, even when the main memory being written by a DMA write is marked uncacheable. For example, such pessimistic behavior has been observed on the Intel x86 Sandy Bridge EP platform, with a DMA write from a device to main memory marked uncacheable ("UC") in the appropriate memory type range registers ("MTRRs"). Such evictions represent a potential security risk for a software cryptoprocessor, which relies on keeping cleartext sensitive data in the cache and encrypting the sensitive data before it leaves the CPU package.

DETAILED DESCRIPTION

Figure 1:
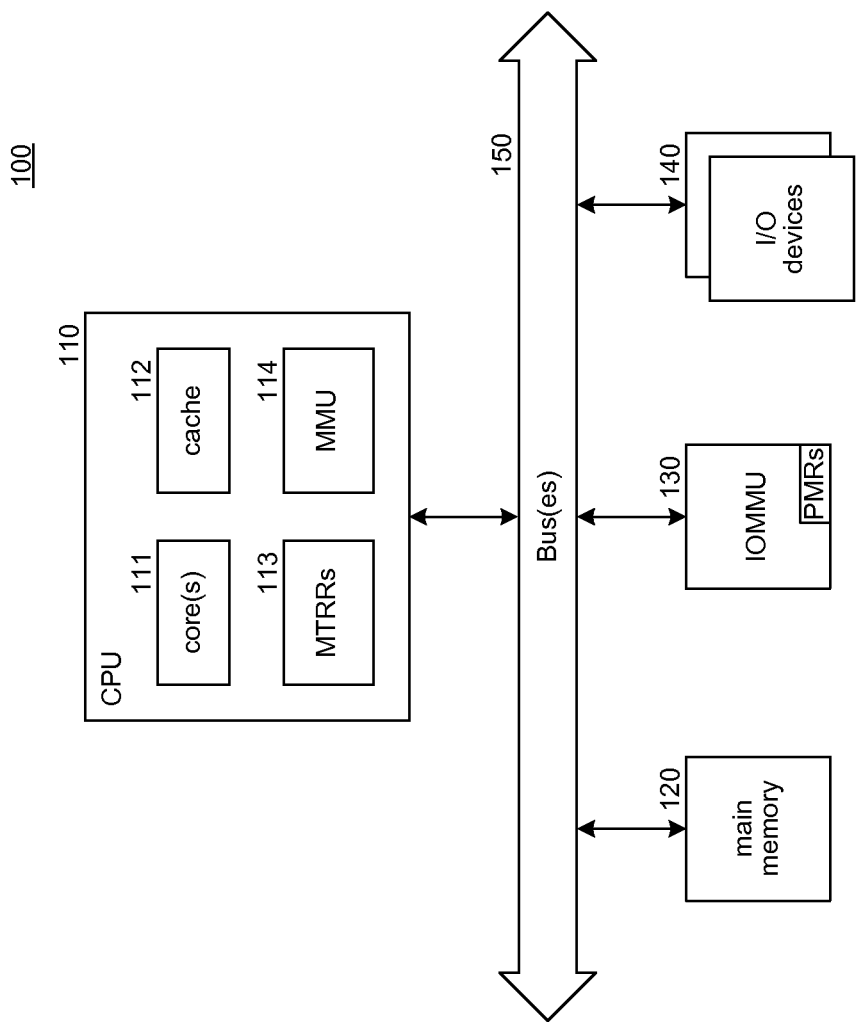
FIG. 1 is a block diagram that illustrates an architecture of a typical computing system.

Methods and systems for securing sensitive data from security risks associated with DMA by I/O devices are provided. An enhanced software cryptoprocessor ("ESC") system secures sensitive data using various techniques, including (1) preventing DMA by an I/O device to the portion of the cache that stores the sensitive data, (2) preventing cross-device access to device data and device access to kernel memory using DMA isolation, and (3) preventing the pessimistic eviction of cache lines on DMA writes to main memory. The ESC system may use these techniques individually, may use any combination of two techniques, or may use all three techniques to help prevent security risks.

Preventing DMA to Trusted Cache

In some embodiments, the ESC system prevents DMA by I/O devices to trusted cache by configuring a hardware I/O protection mechanism of typical processor systems to prevent DMA by the I/O devices to cacheable main memory that maps to the trusted cache. Because the sensitive data is stored in trusted cache mapped to by cacheable main memory that an I/O device cannot access via DMA, the ESC system prevents access to such sensitive data by malicious or malfunctioning I/O devices. The ESC system may use any available hardware I/O protection mechanism that can prevent DMA by I/O devices to specified regions of main memory.

In some embodiments, the ESC system may use a hardware I/O protection mechanism such as the Intel VT-d I/O page tables or the Intel VT-d Protected Memory Regions ("PMRs") to prevent DMA by the I/O devices to main memory that maps to trusted cache. Although the ESC system may use I/O page tables as the hardware I/O protection mechanism, their use can present some problems. The storing of I/O page tables in cacheable main memory may consume a significant amount of cache. Because the cache may be scarce, such storing in cacheable main memory may severely limit the amount of cache available for storing user applications and system software (e.g., hypervisor or operating system kernel), resulting in performance degradation. The storing of the I/O page tables in uncacheable main memory may also degrade performance because access to uncached I/O page tables is much slower than access to cached I/O page tables. Moreover, such storing in uncacheable main memory may present a security risk because uncacheable main memory is untrusted memory and may be subject to a malicious attack. To avoid these problems, the ESC system may use PMRs, rather that I/O page tables, as the hardware I/O protection mechanism. The ESC system may set the PMR base and bound registers to prevent DMA by I/O devices to main memory that maps to trusted cache.

Although the use of PMRs overcomes these problems of using I/O page tables, the advantages of using I/O page tables may nevertheless outweigh the disadvantages caused by the performance degradation. For example, I/O page tables may allow a larger number of regions at page granularity to be specified. Also, some I/O memory management units ("IOMMUs") support notifications of failed transactions, such as I/O page faults. Because of the page granularity offered by I/O page tables, the ESC system may be able to detect attempted attacks more often than when using the coarser granularity of PMRs. Such notifications may also allow the ESC system to employ "on demand" bounce buffering (described below) when an I/O device attempts an unauthorized DMA to a page.

Preventing Cross-Device Access

In some embodiments, although the ESC system can prevent DMA by I/O devices to main memory that maps to trusted cache, the device drivers need their driver data (e.g., including a copy of the device data) to be stored in trusted cache to ensure that their driver data cannot be accessed by an I/O device. The ESC system uses "bounce buffers" to allow DMA by I/O devices to device data stored only in untrusted memory (e.g., untrusted cache or main memory not mapped to trusted cache) and to allow access by the device drivers to driver data stored in trusted cache. The ESC system allocates a bounce buffer for an I/O device in untrusted memory and a device driver buffer in trusted cache. Because the bounce buffer is stored in untrusted memory that does not map to trusted cache, the I/O device cannot access any kernel memory, which is trusted memory. The I/O device performs DMA to read and write device data only to the bounce buffer. When the I/O device completes a DMA write to the bounce buffer, the ESC system copies the device data from the bounce buffer to the device driver buffer. Because the device driver accesses the device data in the device driver buffer, which is in trusted cache that I/O devices cannot access via DMA, TOCTOU attacks from I/O devices using DMA are prevented. When the I/O device initiates a DMA read to the bounce buffer, the ESC system copies the device data from the device driver buffer to the bounce buffer. System software may allow software components to register to receive notifications of initiation and completion of a DMA. The ESC system may register to receive such notifications for the I/O devices so that it can copy the data between the bounce buffers and the device driver buffers to ensure that the I/O devices and the device drivers have a coherent view of the device data. Although bounce buffering has been used to bounce device data between a DMA to low memory, which is I/O device addressable, and high memory, which is not I/O device addressable, the ESC system employs bounce buffering to bounce device data between buffers that may both be in I/O device addressable memory.

In some embodiments, the ESC system implements bounce buffering as a modification to system software. The system software may continue to use the same techniques it normally employs for allocating system memory for DMA by I/O devices except that it allocates the system memory from the bounce buffers. Some system software may allocate the system memory for DMA in such a way that the bounce buffers for the different I/O devices are on the same page of memory at the same time. Such allocating of bounce buffers for multiple I/O devices on the same page presents a security risk because that page needs to be accessible by each I/O device at the same time. With such access to that page by multiple I/O devices, one I/O device could maliciously or inadvertently access the device data of another I/O device.

To prevent the security risk resulting from the allocation of bounce buffers for multiple I/O devices on the same page, the ESC system ensures that bounce buffers for different I/O devices are allocated on different pages to isolate the bounce buffers. The ESC system configures the computing system to limit DMA to a page that contains a bounce buffer for an I/O device to only that I/O device. Because a bounce buffer for only a single I/O device is stored on a page that cannot be accessed by other I/O devices via DMA, the security risk is avoided. The ESC system may allocate bounce buffers from a common pool of pages or may use a separate pool of pages for each I/O device. To prevent device data from being accessed by unauthorized I/O devices, the ESC system may overwrite (e.g., zero out) a bounce buffer after a DMA completes.

Preventing Pessimistic Cache Evictions

In some embodiments, the ESC system manages cache to prevent cache evictions, such as during a DMA write to a bounce buffer in main memory. As described above, with DDIO technology, a DMA write even to uncacheable main memory may result in a cache eviction. To prevent such a cache eviction, the ESC system controls the amount of unused cache and the placement of the bounce buffers in main memory to ensure that, when a DMA write occurs to a bounce buffer, no cache line is pessimistically evicted. The amount of unused cache and the placement of the bounce buffers are dependent on how a particular processor maps main memory to cache lines. For example, a set-associative cache may be viewed as a matrix of rows and columns of cache lines. Any cache line of main memory with an address that maps to a row may be stored in any column of that row. Each cache line of main memory may be mapped to the rows sequentially with cache lines of main memory whose addresses are multiples of the number of rows being mapped to the same row. With such a mapping, the ESC system may allocate the bounce buffers starting at an address that would map to the first row and with a size that has no more cache lines than there are rows. The ESC system may also define the cacheable main memory so that the number of cache lines of memory that map to a row is no more than one less than the number of columns—leaving one column unused. In this way, the amount of unused cache and the placement of the cacheable main memory will ensure that a DMA write to a bounce buffer will not result in a cache line being pessimistically evicted.

In some embodiments, the mapping of addresses to rows of the cache may be determined from documentation describing the architecture of the processor. The ESC system can then be programmed or configured so that cache lines will not be pessimistically evicted. Alternatively, the ESC system or some other system software could at boot time automatically determine the address to cache mapping using techniques such as those described in U.S. patent application Ser. No. 14/479,239, entitled "System and Method for Partitioning Memory Units into Non-Conflicting Sets" and filed on Sep. 5, 2014, which is hereby incorporated by reference.

In some embodiments, the ESC system enables a computing system to perform a method for preventing access to sensitive data by an I/O device of the computing system by preventing DMA to cache and using bounce buffers. The sensitive data may be secured by the ESC system executing on the computing system. The ESC system configures an I/O protection mechanism of the computing system to prevent a DMA by the I/O device to cacheable main memory that maps to trusted cache. The ESC system allocates a bounce buffer in main memory and a device driver buffer in trusted cache. When the I/O device completes a DMA write to the bounce buffer, the ESC system copies device data from the bounce buffer to the device driver buffer, and when the I/O device initiates a DMA read from the bounce buffer, the ESC system copies device data from the device driver buffer to the bounce buffer. The ESC system may also prevent evictions from trusted cache to main memory. The preventing of evictions may include leaving a portion of the cache unused so that a DMA write to main memory will not result in a pessimistic eviction. The I/O protection mechanism may be based on I/O page tables of an IOMMU or may be based on protected memory regions of an IOMMU. The ESC system may allocate the bounce buffer from a page of uncacheable or cacheable main memory that is not accessible to another I/O device. The ESC system may configure an I/O page table entry for the page to indicate that the page is not accessible to another I/O device. When the bounce buffer is no longer needed for DMA, the ESC system may overwrite the bounce buffer to prevent an unauthorized access.

In some embodiments, the ESC system enables a computing system to prevent pessimistic evictions from a cache as a result of a DMA write by an I/O device to main memory. The computing system comprises a processor with a cache and main memory. The computing system may also include a software component that, when executed by the processor, allocates a buffer in main memory that does not map to trusted cache for the DMA write and leaves a portion of the cache unused to suppress the pessimistic eviction that would occur during a DMA write to the buffer if the entire cache were used. The software component may be stored in the cache during execution. The software component may configure an I/O protection mechanism of the computing system to prevent a DMA write to trusted cache by an I/O device. The software component may allocate the buffer at main memory locations that map to the unused cache. The determining of the mapping of the main memory locations to the cache may be determined at boot time.

In some embodiments, the ESC system comprises computer-executable instructions stored on a computer-readable storage medium. The computer-executable instructions control a computing device to prevent access to sensitive data by an I/O device of the computing system. The computing system has memory that includes main memory and a cache. The ESC system configures an I/O protection mechanism of the computing system to prevent DMA by the I/O device to cacheable main memory that maps to trusted cache, which stores the sensitive data. The ESC system allocates a bounce buffer in main memory that does not map to trusted cache and a device driver buffer in the cacheable main memory that maps to the trusted cache and enables DMA by the I/O device to the bounce buffer. The ESC system copies data between the bounce buffer and the device driver buffer to maintain coherency between the bounce buffer and the device driver buffer. The ESC system also prevents evictions from cache to main memory and may do so by leaving a portion of the cache unused so that a DMA write to main memory, which may be uncacheable main memory, will not result in a pessimistic eviction. The ESC system may also configure the cacheable main memory with the write-back model to suppress the writing of data to main memory when the data is written to cache. The ESC system may allocate the bounce buffer from a page of uncacheable memory that is not accessible to another I/O device. The ESC system may register to receive notifications of initiation of a DMA read from the bounce buffer and completion of a DMA write to the bounce buffer to initiate the copying of the data between the bounce buffer and the device driver buffer.

FIG. 1 is a block diagram that illustrates an architecture of a typical computing system. The computing system 100 includes a CPU 110, a main memory 120, an IOMMU 130, and I/O devices 140 that are interconnected via one or more buses 150. The CPU includes one or more processing cores 111, a cache 112, MTRRs 113 and a memory management unit ("MMU") 114. The CPU includes MTRRs for configuring what portions of the main memory are cacheable and the cache model to use (e.g., write-through or write-back). The IOMMU includes PMR registers for configuring portions of main memory to which DMA is enabled by I/O devices. Although not illustrated, the IOMMU may access I/O page tables stored in main memory that may be configured to specify the pages of the main memory to which an I/O device has DMA. The main memory may also store system software such as an operating system (e.g., Linux), including its kernel. The ESC system may be implemented as a modification to the kernel, as a software component (e.g., including various modules) that interfaces with the kernel or other system software, or some combination of a modification to the kernel and a software component that interfaces with the system software. During execution, the ESC system may be stored in trusted cache.

The computing system on which the ESC system may be implemented may include a central processing unit, I/O devices, storage devices (e.g., memory and disk drives), network interfaces, graphics processing units, accelerometers, cellular radio link interfaces, global positioning system devices, trusted platform modules, and so on. The I/O devices may include mass storage systems, keyboards, pointing devices, touch screens, gesture recognition devices (e.g., for air gestures), head and eye tracking devices, microphones for voice recognition, network interface cards, and so on. The computing systems may include desktop computers, laptops, tablets, e-readers, personal digital assistants, smartphones, gaming devices, servers, and computer systems such as massively parallel systems. The computing systems may access computer-readable media that include computer-readable storage media and data transmission media. The computer-readable storage media are tangible storage means that do not include a transitory, propagating signal. Examples of computer-readable storage media include memory such as main memory, cache, and secondary memory (e.g., DVD) and include other storage means. The computer-readable storage media may have recorded upon or may be encoded with computer-executable instructions or logic that implements the ESC system. The data transmission media is used for transmitting data via transitory, propagating signals or carrier waves (e.g., electromagnetism) via a wired or wireless connection.

The ESC system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the ESC system may be implemented in hardware using, for example, an application-specific integrated circuit ("ASIC").

Figure 2:
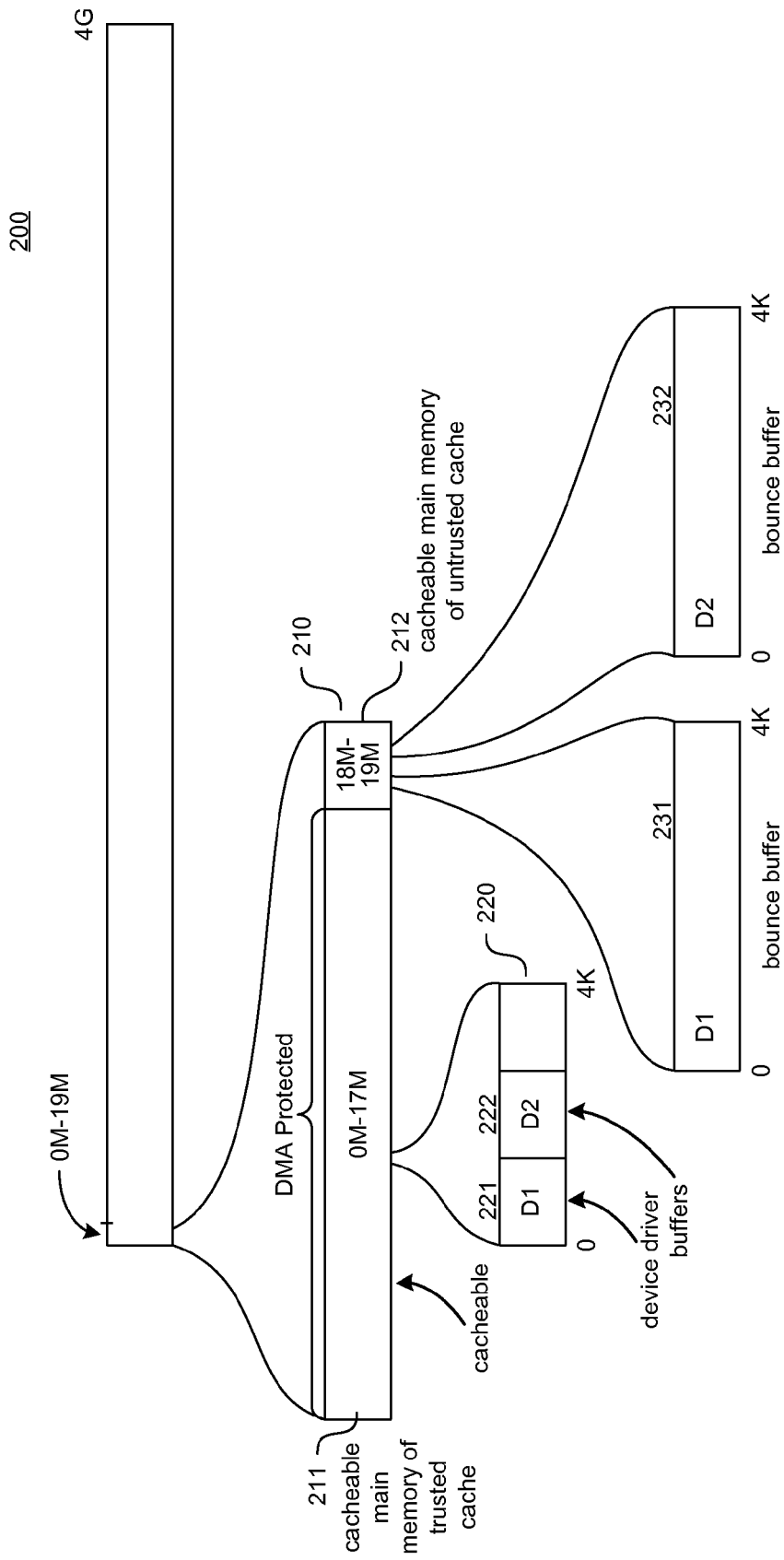
FIG. 2 is a block diagram that illustrates cacheable main memory in some embodiments.

FIG. 2 is a block diagram that illustrates cacheable main memory in some embodiments. Main memory 200 may be 4 G bytes, and the cache (not illustrated) may be 20 M bytes (i.e., 0 M-19 M). The amount of main memory and cache can, of course, vary based on the design of the computing system (e.g., processor's architecture). The ESC system may configure 20 M bytes of main memory 210 to be cacheable. The ESC system may configure the cacheable main memory with the write-back model. The ESC system may configure 18 M bytes (i.e., 0 M-17 M) of the cacheable main memory 211 to be inaccessible by an I/O device via DMA and thus be cacheable main memory of trusted cache. The ESC system may configure 2 M bytes (i.e., 18 M-19 M) of the cacheable main memory 212 to be accessible by an I/O device via DMA and thus be cacheable main memory of untrusted cache. The ESC system may allocate device driver buffers 221 and 222 for different I/O devices from a page 220 in cacheable main memory. The ESC system may allocate a bounce buffer 231 for one of the I/O devices from one page in cacheable main memory and a bounce buffer 232 for the other I/O device from a different page in cacheable main memory. The computing system may allow DMA transfers by an I/O device directly to the cache using DDIO technology. If the processor's mapping from main memory to cache lines is such that a cache eviction could occur with a DMA write to a bounce buffer, then the ESC system may leave a sufficient amount and placement of the cache unused (i.e., which is dependent on the processor's mapping) so that such a cache eviction cannot occur on a DMA write to a bounce buffer either to cacheable main memory or directly to untrusted cache using DDIO technology. Also, even if the ESC system were to allocate the bounce buffers in uncacheable main memory, because of the pessimistic behavior of DDIO technology, the ESC system may need to leave a sufficient amount and placement of cache unused so that a pessimistic eviction will not occur on a DMA write to the bounce buffers.

Figure 3:
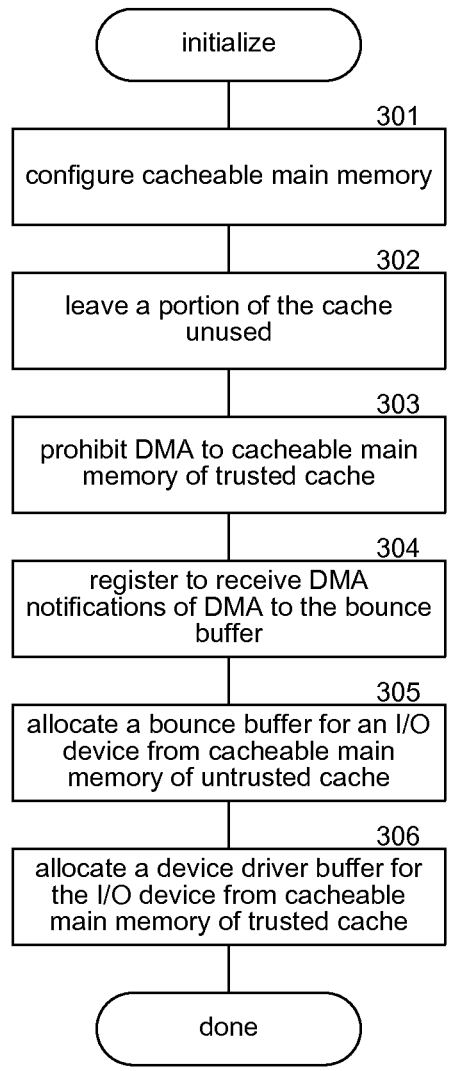
FIG. 3 is a flow diagram that illustrates an initialize component of the ESC system in some embodiments.

FIG. 3 is a flow diagram that illustrates an initialize component of the ESC system in some embodiments. The initialize component 300 configures a computing system to support secure DMA by I/O devices. In block 301, the component configures a portion of main memory to be cacheable, for example, by setting the MTRRs. In block 302, the component ensures that a portion of the cache is left unused to prevent evictions on a DMA write to main memory. In block 303, the component configures the computing system to prohibit DMA to cacheable main memory that maps to trusted cache, for example, by setting the PMRs. In block 304, the component registers to receive notifications of DMA to the bounce buffer for maintaining coherency between the bounce buffer and the device driver buffer. Alternatively, the kernel may be modified to maintain coherency on initiation of a DMA read and completion of a DMA write. In block 305, the component allocates a bounce buffer for an I/O device from cacheable main memory that maps to untrusted cache, for example, by allocating a page that is not DMA accessible by any other I/O device. In block 306, the component allocates a device driver buffer for the I/O device from cacheable main memory that maps to the trusted cache. The component then completes.

Figure 4:
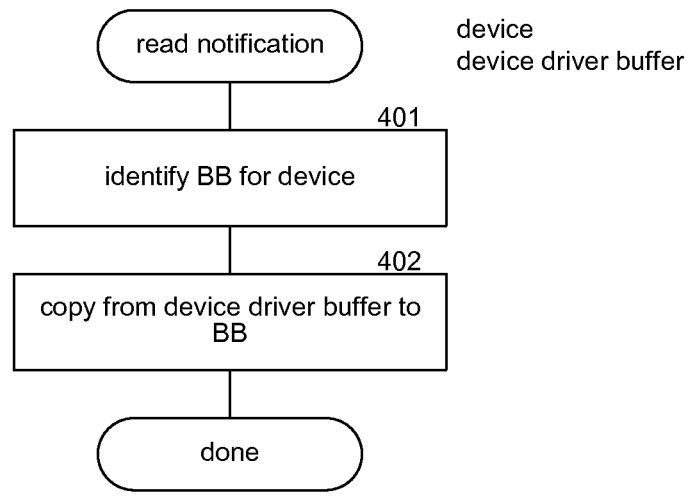
FIG. 4 is a flow diagram that illustrates the processing of a read notification component in some embodiments.

FIG. 4 is a flow diagram that illustrates the processing of a read notification component in some embodiments. The read notification component 400 is invoked when a notification is received that an I/O device is initiating a DMA read from a bounce buffer. The component may be passed an indication of the I/O device and the device driver buffer that contains the device data. In block 401, the component identifies the bounce buffer for the I/O device. In block 402, the component copies the device data from the device driver buffer to the bounce buffer for the I/O device. The component then completes.

Figure 5:
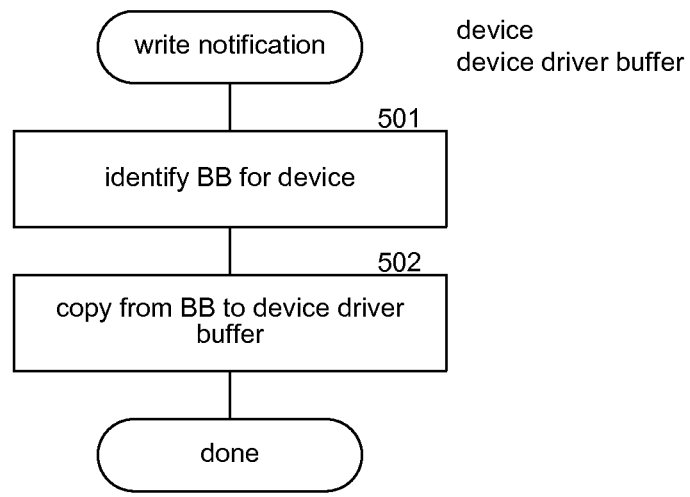
FIG. 5 is a flow diagram that illustrates the processing of a write notification component in some embodiments.

FIG. 5 is a flow diagram that illustrates the processing of a write notification component in some embodiments. The write notification component 500 is invoked when a notification is received that an I/O device has completed a DMA write to a bounce buffer. The component may be passed an indication of the I/O device and the device driver buffer to which the device data is to be written. In block 501, the component identifies the bounce buffer for the I/O device. In block 502, the component copies the device data from the bounce buffer for the I/O device to the device driver buffer. The component then completes.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A computing system for preventing pessimistic evictions from a cache as a result of a direct memory access ("DMA") write by an input/output ("I/O") device to main memory, the computing system comprising:
a processor having a cache;
main memory; and
a software component that when executed by the processor
allocates a buffer in the main memory for the DMA write; and
leaves a portion of the cache unused to suppress a pessimistic eviction that would occur during a DMA write to the buffer if the entire cache were used.

2. The computing system of claim 1 wherein the software component is part of a software cryptoprocessor.

3. The computing system of claim 1 wherein the software component is stored in the cache.

4. The computing system of claim 3 wherein the software component configures an I/O protection mechanism of the computing system to prevent a DMA write to trusted cache by an I/O device.

5. The computing system of claim 1 wherein the buffer is allocated at memory addresses that map to the unused cache.

6. The computing system of claim 5 wherein a mapping of the memory addresses to the cache is determined at boot time.

7. A method performed by a computing system for preventing access to sensitive data by an input/output ("I/O") device of the computing system, the sensitive data being secured by a software cryptoprocessor executing on the computing system, the computing system having memory that includes main memory and a cache, the method comprising:
configuring an I/O protection mechanism of the computing system to prevent direct memory access ("DMA") by the I/O device to cacheable main memory that maps to a trusted cache that stores the sensitive data, wherein the I/O device cannot access the trusted cache via DMA;
allocating a bounce buffer in untrusted memory, to which DMA by the I/O device is allowed, and a device driver buffer in the trusted cache;
when the I/O device completes a DMA write to the bounce buffer, copying device data from the bounce buffer to the device driver buffer; and
when the I/O device initiates a DMA read from the bounce buffer, copying the device data from the device driver buffer to the bounce buffer.

8. The method of claim 7 further comprising preventing evictions from trusted cache to main memory.

9. The method of claim 8 wherein the preventing of evictions includes leaving a portion of the cache unused so that a DMA write to main memory will not result in a pessimistic eviction.

10. The method of claim 7 wherein the I/O protection mechanism is based on I/O page tables of an I/O memory management unit.

11. The method of claim 7 wherein the I/O protection mechanism is based on protected memory regions of an I/O memory management unit.

12. The method of claim 7 wherein the allocating of the bounce buffer is from a page of main memory that is not accessible to another I/O device.

13. The method of claim 12 further comprising, when the bounce buffer is no longer needed by a DMA, overwriting the bounce buffer to prevent unauthorized access to the device data.

14. The method of claim 12 further comprising configuring a page table entry for the page to indicate that the page is not accessible to another I/O device.

15. A computer-readable storage medium storing computer-executable instructions for controlling a computing system to prevent access to sensitive data by an input/output ("I/O") device of the computing system, the computing system having memory that includes main memory and a cache, the computer-executable instructions comprising instructions that:
configure an I/O protection mechanism of the computing system to prevent direct memory access ("DMA") by the I/O device to cacheable main memory that maps to a trusted cache that stores the sensitive data, wherein the I/O device cannot access the trusted cache via DMA;
allocate a bounce buffer in the main memory and a device driver buffer in the trusted cache wherein DMA by the I/O device to the bounce buffer is enabled;
copy data between the bounce buffer and the device driver buffer to maintain coherency between the bounce buffer and the device driver buffer; and
prevent evictions from the trusted cache to the main memory.

16. The computer-readable storage medium of claim 15 wherein the instructions that prevent evictions leave a portion of the cache unused so that a DMA write to main memory will not result in a pessimistic eviction.

17. The computer-readable storage medium of claim 16 wherein the DMA write is to cacheable main memory that maps to untrusted cache.

18. The computer-readable storage medium of claim 15 wherein the computer-executable instructions further comprise instructions that configure the cache with a write-back model.

19. The computer-readable storage medium of claim 15 wherein the bounce buffer is allocated from a page of main memory that is not accessible to another I/O device.

20. The computer-readable storage medium of claim 15 wherein the computer-executable instructions further comprise instructions that register to receive notifications of initiation of a DMA read from the bounce buffer and completion of a DMA write to the bounce buffer to initiate the copying of the data between the bounce buffer and the device driver buffer.

* * * * *